United States Patent
Lee et al.

(10) Patent No.: US 6,944,454 B1
(45) Date of Patent: Sep. 13, 2005

(54) METHOD AND APPARATUS FOR EXPANDING CELL COVERAGE IN MOBILE COMMUNICATION SYSTEM

(75) Inventors: Jun-Woo Lee, Seoul (KR); Byung-Jin Ko, Seoul (KR); Ha-Jae Jung, Namyangju-Shi (KR); Sung-Cheol Hong, Anyang-Shi (KR); Seon-Ho Sim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 09/622,020

(22) PCT Filed: Dec. 8, 1999

(86) PCT No.: PCT/KR99/00765

§ 371 (c)(1),
(2), (4) Date: Aug. 8, 2000

(87) PCT Pub. No.: WO00/35128

PCT Pub. Date: Jun. 15, 2000

(30) Foreign Application Priority Data

Dec. 8, 1998 (KR) .................................. 98/53725
Aug. 6, 1999 (KR) ............................... 1999/32389

(51) Int. Cl.⁷ ............................................. H04Q 7/20
(52) U.S. Cl. ..................................... 455/443; 455/444
(58) Field of Search ............................... 455/446, 561, 455/562, 506, 440, 441, 63.2, 67.16, 242.1, 455/2, 243.1, 143, 33.1, 442–444, 288; 370/280, 370/335; 342/85, 84

(56) References Cited

U.S. PATENT DOCUMENTS

| 5,541,979 | A |   | 7/1996 | Leslie et al. |
| 5,781,541 | A | * | 7/1998 | Schneider ............... 370/335 |
| 6,212,405 | B1 | * | 4/2001 | Jiang et al. ............. 455/561 |
| 6,388,997 | B1 | * | 5/2002 | Scott ..................... 370/280 |

* cited by examiner

*Primary Examiner*—Nick Corsaro
*Assistant Examiner*—Tu Nguyen
(74) *Attorney, Agent, or Firm*—Blakely Sokoloff Taylor & Zafman

(57) ABSTRACT

A method, apparatus and storage mediums executed by a computer and storing the method, for expanding cell coverage in mobile communication system is disclosed. The method comprises the steps of: a) shifting a preamble window by delaying a transmission signal in order to catch a first call access signal from a mobile station at a remote distance; and b) delaying a second call access signal from a mobile station at a short distance in order to catch the second call access signal.

24 Claims, 9 Drawing Sheets

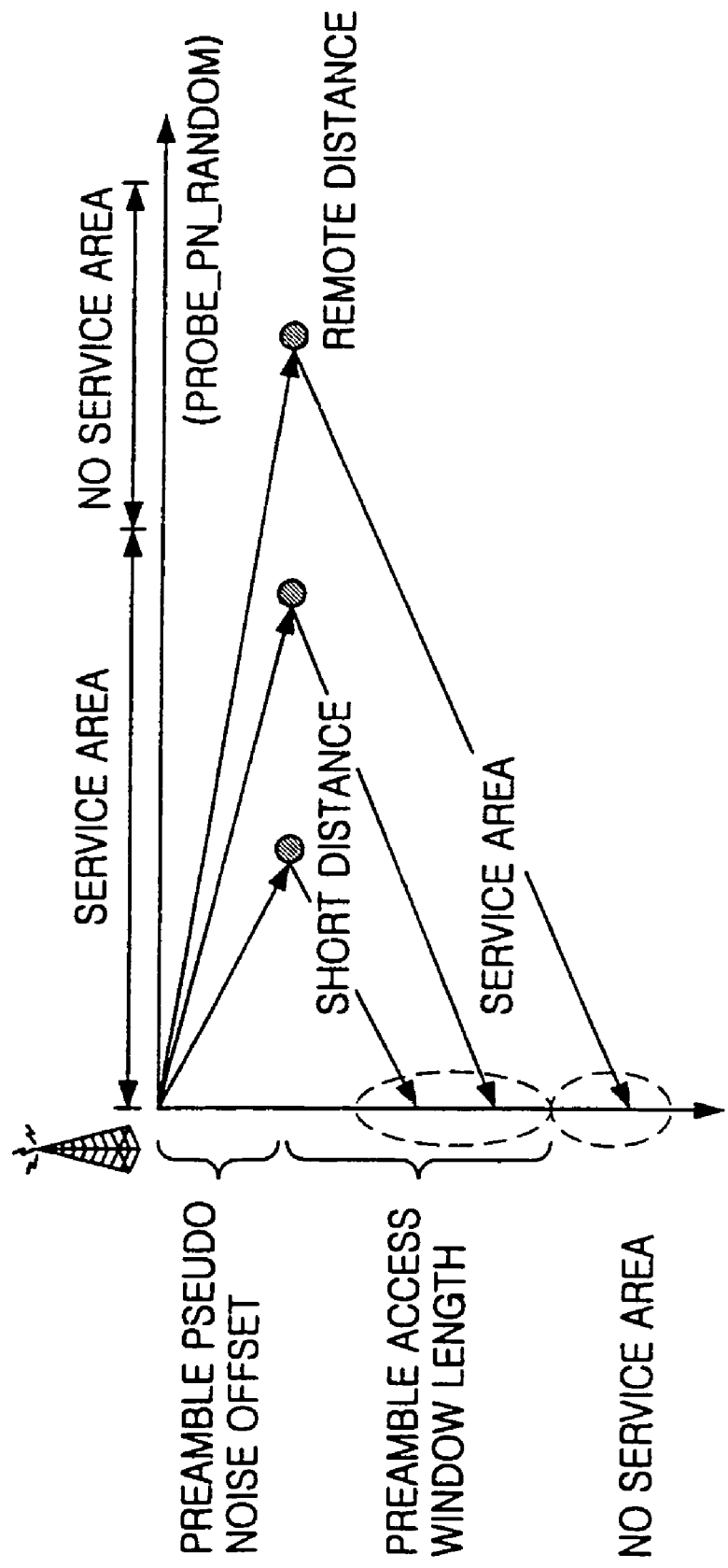

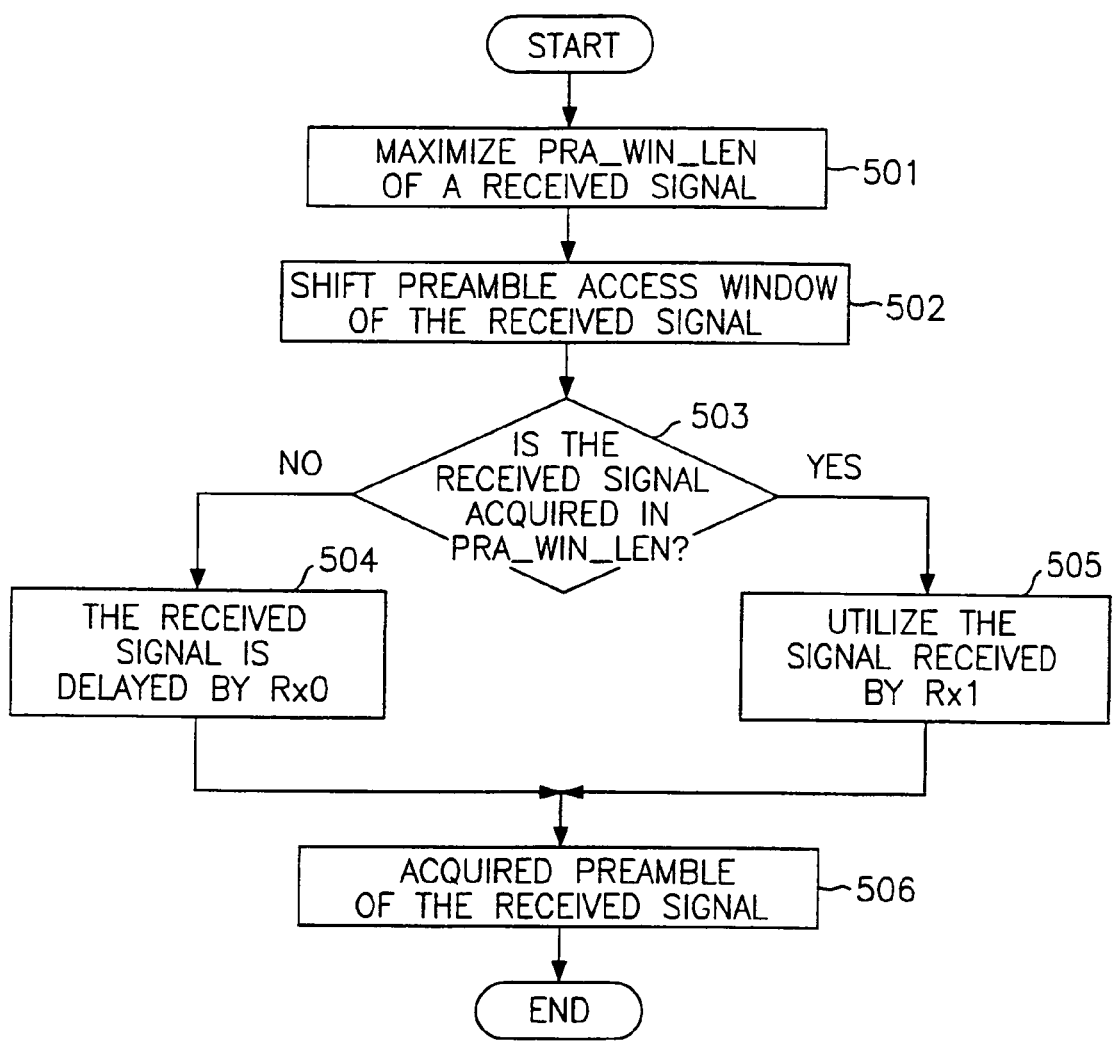

METHOD AND APPARATUS FOR EXPANDING CELL COVERAGE IN MOBILE COMMUNICATION SYSTEM

FIELD OF THE INVENTION

The present invention relates to a method and apparatus for expanding cell coverage in a mobile communication system; and more particularly, relates to a method and apparatus for expanding cell coverage by advancing a transmission signal and selectively delaying a received signal in code division multiple access (CDMA) system.

PRIOR ART OF THE INVENTION

FIG. 1 shows a general CDMA mobile communication system.

A mobile station (MS) 11 communicates a call setup signal and a traffic signal with a base station (BS) 12 through a radio path and performs signal processing function for speech conversion and called/calling speech.

The BS 12 performs communication of the call setup signal and the traffic signal with the MS 11 through the radio path and a call control function. The BS 12 is coupled to a base station controller (BSC) 13 with a wired line and transmits the call setup and the traffic signals from the MS 11 to the BSC 13 and message from the BSC 13 to the MS 11. Also, the BS 12 performs a signal processing function for communication with the BSC 13 and maintenance function. The BS 12 provides services in at least one or more sectors in which a cell is divided a certain number of sectors.

The BSC 13 is coupled to a plurality of the BSs 12 and a mobile switching center (MSC) 14. The BSC 13 performs called/calling processing and handoff of the call, and management and maintenance of the BS.

The MSC 14 is coupled to the BSC 13, a public switching telecommunication network (PSTN) and another MSC 14. The MSC 14 performs called/calling processing, handoff and management/maintenance for a mobile communication system.

In a general mobile communication system, a plurality of the base stations 12 are placed in a service area having a plurality of cells, regarding efficient frequency allocation and power consume etc. The cell serviced by one BS 12 includes a certain number of sectors. When the MS 11 moves to another sector or another cell on calling, the MS 11 is continuously connected to another base station 12 or a radio channel of another sector (which is referred to 'handoff').

Hereinafter, access parameters between the MS and the BS in the general mobile communication system will be described.

Since a signal delayed by approximately 1.5 or more Walsh symbol (cell radius of 45 Km) cannot be participated in demodulation, size of the access parameter for access probe is limited.

Preamble size means a size of preamble contained in a access channel slot. Here, a minimum length of one access channel slot is 4 frames and a maximum length is 26 frames. The preamble size is between 1 and 16 frame(s).

When increasing the preamble size, the BS 12 can accurately capture access of the BS. Also, a length of the preamble access window can be increased, and then a preamble integration period can be reduced. However, overhead is increased, thereby there are some problems that a call setup time is increased and a size of message capsule of the access probe can be reduced. Here, the length of the preamble access window means a size of a search window when the BS 12 detects the preamble of the access probe. The length of the preamble access window ranges from 1 to 3072, in other words, 1/8 pseudo noise chip.

If a round trip delay (RTD) of a signal is 1.5 or more Walsh symbol, the BS 12 cannot process the signal, thereby the RTD being limited to the maximum 384 chips. Here, one (1) Walsh equals to 256 chips. Therefore, when the preamble access window size is large, though a preamble pseudo noise random delay is large, the preamble can be detected and radius of reverse coverage can be increased. However, the preamble integration period should be short, thereby detection of accurate preamble being difficult.

The preamble integration period means time necessary to search an access probe from the MS 11 in an access channel. If the preamble integration period is small, it is difficult an accurate preamble to be detected. However, the length of preamble access window can be increased because of reduction of preamble searching time. Therefore, in order to accurately search the preamble by enlarging the preamble integration period, the length of the preamble access window should be reduced, or the size of the preamble should be enlarged.

A base station channel card includes four base station demodulators (BSD). A combiner performs software combining by interrupting its operation at every 1 Walsh symbol on basis of a global positioning system (GPS) time and reading symbols from the four BSDs.

Here, each of the BSD demodulates a signal received through a different path, which arriving time of the signal is different from each other. Therefore, a finger of the BSD cannot demodulate a signal delayed by deskewing time or more than. In other words, the remote MS more than 1.5 Walsh chip distance cannot access to the BS. The reason is that the signal delayed by the deskewing time can have a different value from a desired signal in case of 1.5 or more than Walsh symbols (PN 384 chips or a radius of 45 km).

Therefore, when demodulating, the window size for detecting the access probe of the MS 11 is limited to PN 384 chips, and then a radius of service area of the BS 12 is limited to about 45 km.

Most effective one to the cell coverage of the BS 12 in parameters for detecting a call access from the MS 11 is the window size for access probe of the MS 11. Here, the window size is determined according to a preamble pseudo noise offset PRA_PN_Offset and the length of the preamble access window PRA_WIN_LEN.

The preamble pseudo noise offset PRA_PN_Offset means an initial value of pseudo noise (PN) offset searched by the BS 12 when the BS 12 searches the preamble of the channel access probe, and a minimum processing delay time of the MS 11 and the BS 12. The preamble pseudo noise offset ranges from 0 to 3072 PN chip(s).

The length of the preamble access window PRA_WIN_LEN means the size of the searching window when the BS 12 detects the preamble of the access probe. The length of the preamble access window ranges from 1 to 3072 PN chip(s).

The access probe timing is illustrated in FIG. 2.

FIG. 2 is a timing diagram illustrating access probe timing in the BS in accordance with the prior art.

When the BS transmits the signal to the MS, if the MS locates within the service coverage of the BS, in other words, if the MS is a short distant or a middle distance from the BS, a round trip delay is acquired within the preamble access window, thereby a call can be set. However, if the MS is a remote distance from the BS, the round trip delay cannot be acquired within the preamble access window, thereby the call cannot be set. As can be seen, if the MS is a remote distance from the BS so that the round trip delay of the signal is not acquired, even though a received power is large enough, a communication service can not be provided.

As mentioned above, if the cell radius in which reverse access probe can be performed is large in a conventional CDMA system and the round trip delay of the signal is large, in other words, the call timing is out of the window size, a call cannot be done.

Therefore, the radius of the cell coverage is limited to about 45 Km in the conventional CDMA system.

SUMMARY OF THE INVENTION

It is an object to provide a method and apparatus for expanding cell coverage by advancing a transmitting signal and selectively delaying a received signal in a mobile communication system.

In accordance with an aspect of the present invention, there is provided a method for expanding cell coverage in mobile communication system comprising the steps of: a) shifting a preamble access window by advancing a transmission signal by a first delay time in order to acquire a first call access signal from a mobile station at a remote distance; and b) delaying a second call access signal from a mobile station at a short distance by a second delay time in order to acquire the second call access signal.

In accordance with another aspect of the present invention, there is provided a method for expanding cell overage in mobile communication system including at least a ase station and a plurality of mobile stations, the method comprising the steps of: a) expanding a length of a current preamble access window to a predetermined value; b) determining the mobile station is within a cell coverage covered by the preamble access window; c) shifting the preamble access window by advancing a transmission signal by a first delay time in order to acquire at lease a mobile station when the mobile station is out of the cell coverage; and d) delaying a second call access signal from a mobile station at a short distance in order to acquire the second call access signal.

In accordance with further another aspect of the present invention, there is provided an apparatus for expanding cell coverage in mobile communication system including a plurality of mobile stations and at least a base station, comprising: transmitting means for transmitting a transmission signal advanced by a first delay time in order to acquire the transmission signal from a mobile station at a remote distance; and receiving means for receiving and delaying a received signal from a mobile station at a short distance by a second delay time in order to acquire the received signal.

In accordance with still another aspect of the present invention, there is provided a method for expanding cell coverage applied to a mobile communication system, the method comprising the steps of: a) expanding a length of a current preamble access window to a maximum value; b) setting operation parameters related to time advance in order to acquire a first call access signal from a mobile station at a remote distance when the mobile station is out of the cell coverage; and c) acquiring a second call access signal from a mobile station at a short distance within the preamble access window by delaying the second call access signal.

In accordance with still another aspect of the present invention, there is provided a method for expanding cell coverage applied to a mobile communication system, the method comprising the steps of: a) expanding a length of a current preamble access window for access probe to a maximum value; b) shifting the preamble access window by setting operation parameters in order to acquire a first call access signal from a mobile station at a remote distance when the mobile station is out of the expanded preamble access window; and c) acquiring a second call access signal from a mobile station at a short distance within the preamble access window by delaying the second call access signal by a feedback delay which makes the second call access signal have a different delay value on basis of a distance between a location of the mobile station and a location on a cell radius.

In accordance with still another aspect of the present invention, there is provided a computer readable media storing a method for expanding cell coverage applied to a mobile communication system, the method comprising the steps of: a) expanding a length of a current preamble access window to a maximum value; b) setting operation parameters in order to acquire a first call access signal from a mobile station at a remote distance when the mobile station is out of the cell coverage; and c) acquiring a second call access signal from a mobile station at a short distance within the preamble access window by delaying the second call access signal.

In accordance with still another aspect of the present invention, there is provided a computer readable media storing a method for expanding cell coverage applied to a mobile communication system, the method comprising the steps of: a) expanding a length of a current preamble access window for access probe to a maximum value; b) shifting the preamble access window by setting operation parameters in order to acquire a first call access signal from a mobile station at a remote distance when the mobile station is out of the expanded preamble access window; and c) acquiring a second call access signal from a mobile station at a short distance within the preamble access window by delaying the second call access signal by a feedback delay which makes the second call access signal have a different delay value on basis of a distance between a location of the mobile station and a location on a cell radius.

BRIEF DESCRIPTION OF THE DRAWINGS

The above and other objects and features of the instant invention will become apparent from the following description of preferred embodiments taken in conjunction with the accompanying drawings, in which:

FIG. 2 is a timing diagram illustrating access probe timing in the BS in accordance with the prior art;

FIG. 5 is a flow chart illustrating a method for expanding a cell coverage in accordance with an embodiment of the present invention;

MODES FOR CARRYING OUT THE INVENTION

Hereinafter, preferred embodiments of the present invention will be described in detail with reference to the accompanying drawings.

Figure 1:
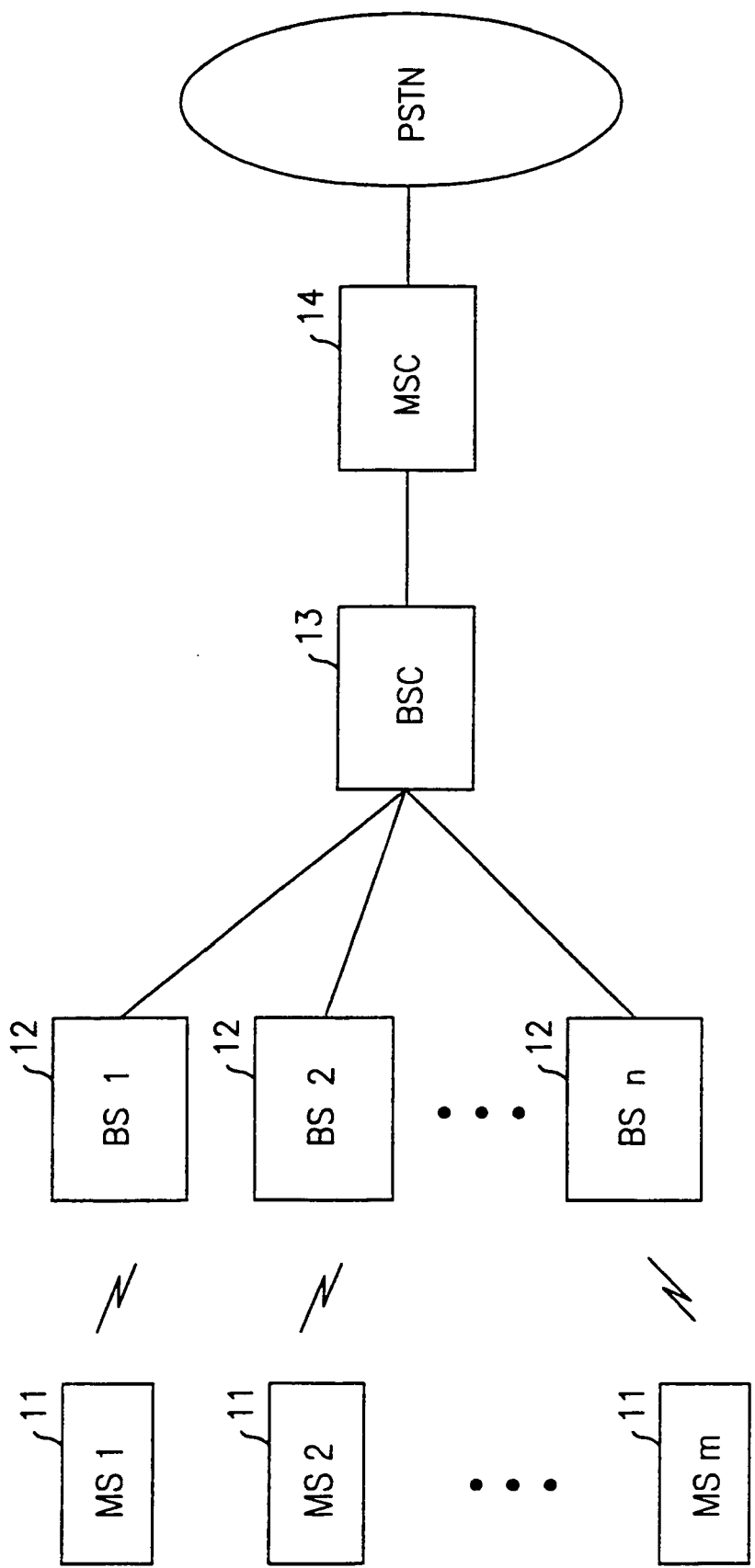
FIG. 1 is a diagram of a general CDMA mobile communication system.
Figure 3A:
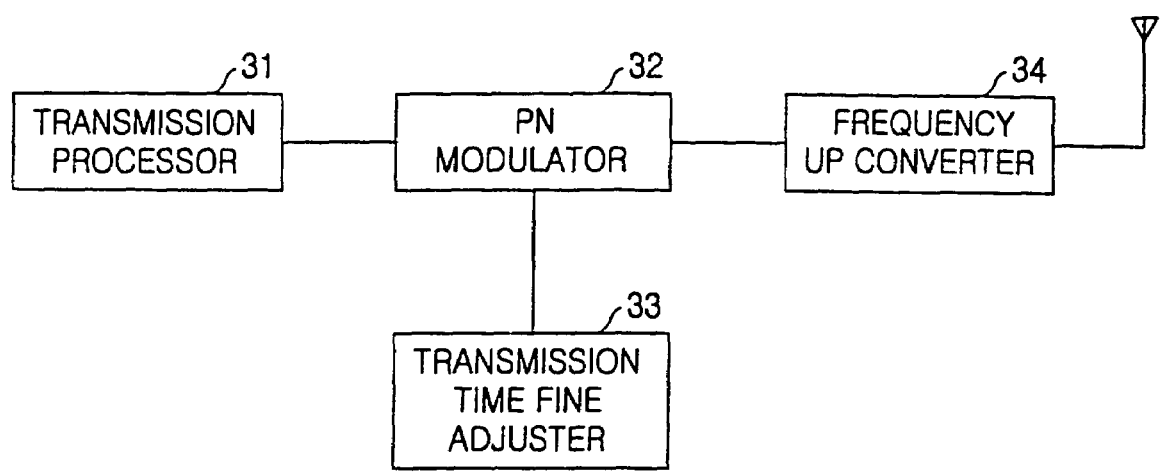
FIG. 3A is a block diagram of a transmitting unit in accordance with an embodiment of the present invention.

FIG. 3A is a block diagram of a transmitting unit in accordance with an embodiment of the present invention.

An original signal to be transmitted goes through transmission signal processing, for example, encoding, interleaving, etc. by a transmission processor 31. The function of the transmission processor 31 is well known to ordinary one skilled in the art, therefore, detailed description will be skipped.

After the transmission signal processing is performed, the signal is modulated by a pseudo noise (PN) modulator 32. In the whole process before transmitting signals through an antenna, processing time delay is inevitable. In order to compensate the processing delay, a parameter, a transmission time advance fine adjust value Tx_Fine_Adj is used. The PN modulator 32 performs PN modulation of the signal from the transmission processor 31 on the basis of the transmission time advance fine adjust value Tx_Fine_Adj from a transmission time fine adjuster 33. The PN modulated signal is up converted by a frequency up converter 34 and transmitted through an antenna.

The transmission time advance fine adjust value Tx_Fine_Adj is a parameter used for compensation of unavoidable time delay caused by the whole signal processing such as PN modulation, interleaving, frequency up converting and etc. In CDMA system, if a signal is delayed when the signal is PN modulated, the signal has a result in being advanced. Therefore, adjusting the transmission time advance fine adjust value Tx_Fine_Adj of the signal makes the signal possible to be acquired within the preamble access window.

If a preamble access window length is maximum, i.e., a chip length is 3072 and a cell radius is limited to 45 Km, a transmission time advance fine adjust value Tx_Fine_Adj is changed in order to expand the cell coverage in the present invention. The transmission time advance fine adjust value Tx_Fine_Adj is expressed as following:

$$\text{Tx\_Fine\_Adj}(\mu s) = \frac{\text{Radius(Km)} \times 2}{3 \times 10^5} \times 10^6 \quad \text{[Eq. 1]}$$

Here, Radius is a length of the expanded radius and a speed of a radio wave is supposed to be equal to the speed of the light.

Figure 3B:
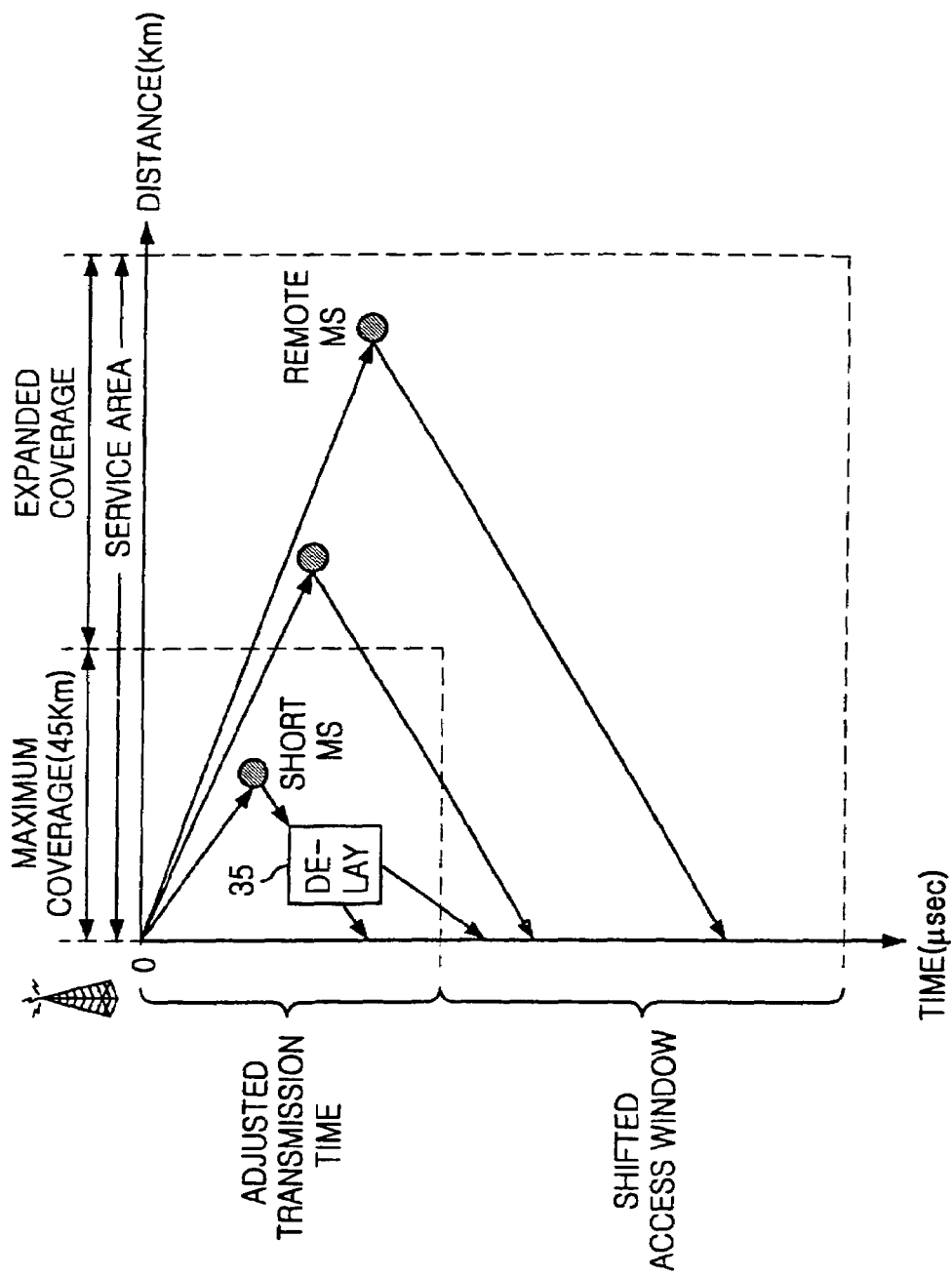
FIG. 3B is a diagram illustrating a method for expanding a cell coverage using an adjusted transmission time and a delay element in accordance with an embodiment of the present invention.

FIG. 3B is a diagram illustrating a method for expanding a cell coverage using an adjusted transmission time and a delay element in accordance with an embodiment of the present invention.

As described above, if the preamble access window is shifted by the transmission time advance fine adjust value Tx_Fine_Adj, a mobile station (MS) at a remote distance can communicate with the BS. However, a MS at a short distance can fail to communicate with the BS. For preventing the MS at a short distance from failing in communication with the BS, a received signal is delayed by a delay 35 which is added in a receiving unit of the BS, such that the signal from the MS at a short distance is acquired within the preamble access window.

A delay amount of the delay 35 is expressed as following:

$$\text{Delay amount}(\mu s) = \text{Tx\_Fine\_Adj}(\mu s) = \frac{\text{Radius(Km)} \times 2}{3 \times 10^5} \times 10^6 \quad \text{[Eq. 2]}$$

Figure 4:
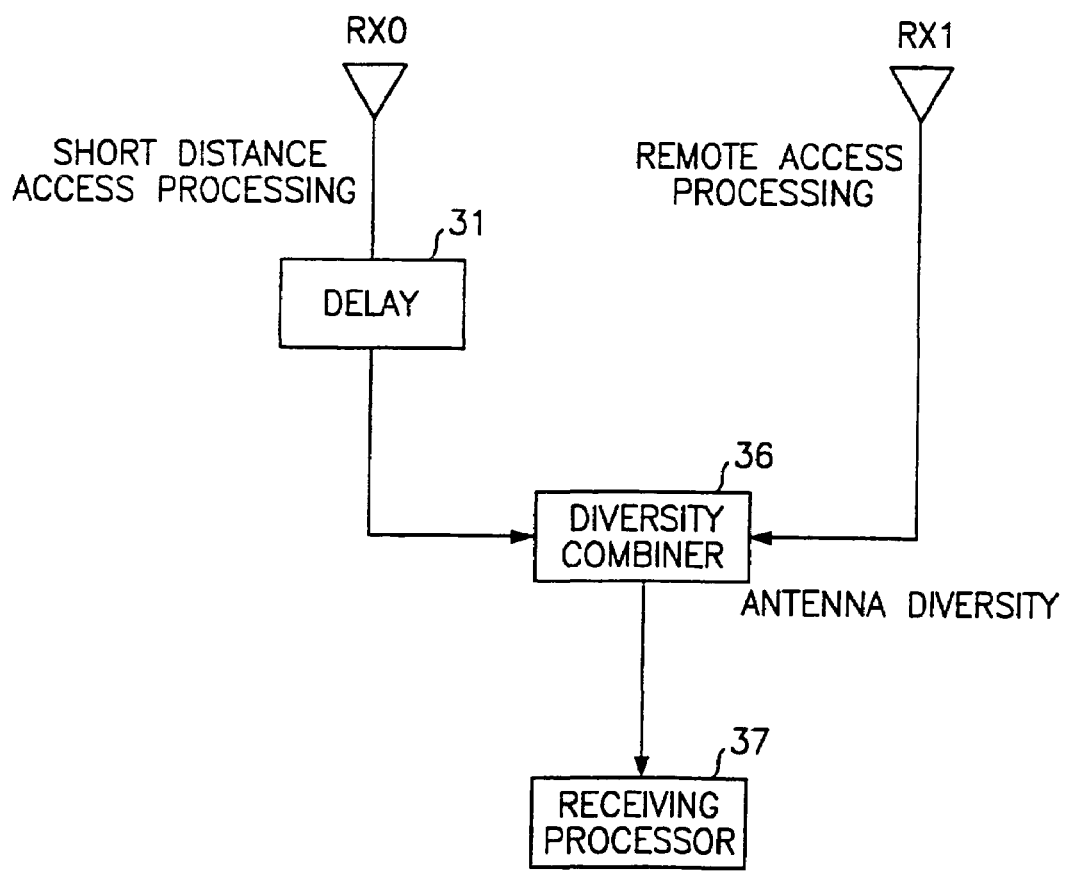
FIG. 4 is a block diagram of a receiving unit having a delay in a reverse link in accordance with an embodiment of the present invention.

A receiving unit having a delay in a reverse link is illustrated in FIG. 4.

Referring to FIG. 4, a signal from a remote distance is received by a receiving element Rx1 and a signal from a short distance is received by a receiving element Rx0 and delayed by a delay 31. Therefore, the signal from a short distance can be acquired by a shifted access window by adjusting the transmission time advance fine adjust value Tx_Fine_Adj. The signals from the MSs at the short distance and the remote distance are combined in a diversity combiner 36 and performed a receiving processing by a receiving processor 37, which is well known to ordinary one skilled in the art, for example deinterleaving, decoding, etc. Therefore, a detailed description of the receiving processor 37 will be skipped in here.

FIG. 5 is a flow chart illustrating a method for expanding a cell coverage in accordance with an embodiment of the present invention.

In this embodiment, a signal from a MS at a remote distance further than 5 Km is acquired by shifting back a window for access probe. In this embodiment, though a round trip delay (RTD) of a signal is larger than 45 Km, the window for the access probe can acquire the signal. Here, a signal from the MS at the short distance cannot be acquired because of shifting the access probe window. Therefore, The signal from the short distance is delayed by a delay 31 in FIG. 4, thereby being accessed to the access probe window.

In order to expand a cell radius limited to 45 Km in a general CDMA system, first, a preamble access window length is set as a maximum value, i.e. 3072 at step 501. In this embodiment, the preamble access window length should not have a maximum value, however, for expanding the cell coverage, the preamble access window length is preferred to be set as a maximum value.

At step 502, the preamble access window is shifted by setting parameters related with time advance, e.g., the preamble PN offset PRA_PN_Offset and the transmission time advance fine adjust value Tx_Fine_Adj. The transmission time advance fine adjust value Tx_Fine_Adj for a call connection is set as the equation 1.

The proceed continues to step 503 to determine whether a round trip delay (RTD) of the received signal from the MS is acquired within the preamble access window for the access probe of the system.

If the RTD of the received signal is not acquired, in other words, if the MS is a short distance from the BS, the received signal is delayed by the delay 35 in the receiving unit Rx0 at step 504. Then, the delayed received signal is acquired within the preamble access window and accessed at step 506.

If the RTD of the received signal is acquired, in other words, if the MS is a remote distance from the BS, the signal received by the receiving unit Rx1 without delay is used for the preamble access at step 505 and then is acquired within the preamble access window and accessed at step 506.

As described above, if the preamble access window is shifted, a signal from a remote distance can be acquired preamble access window within the preamble access window. By delaying a signal from a MS at a short distance, which is not acquired, the signal can be acquired within the preamble access window.

However, when expanding the cell coverage by using a general delay, the cell coverage is expanded as larger; as more delays are necessary in accordance with the distance between a point in the cell and a point on the cell radius. If there is no necessary number of delays, a probability of call setup fail can increase. Therefore, a method to solve this problem will be described in another embodiment of the present invention.

Figure 6A:
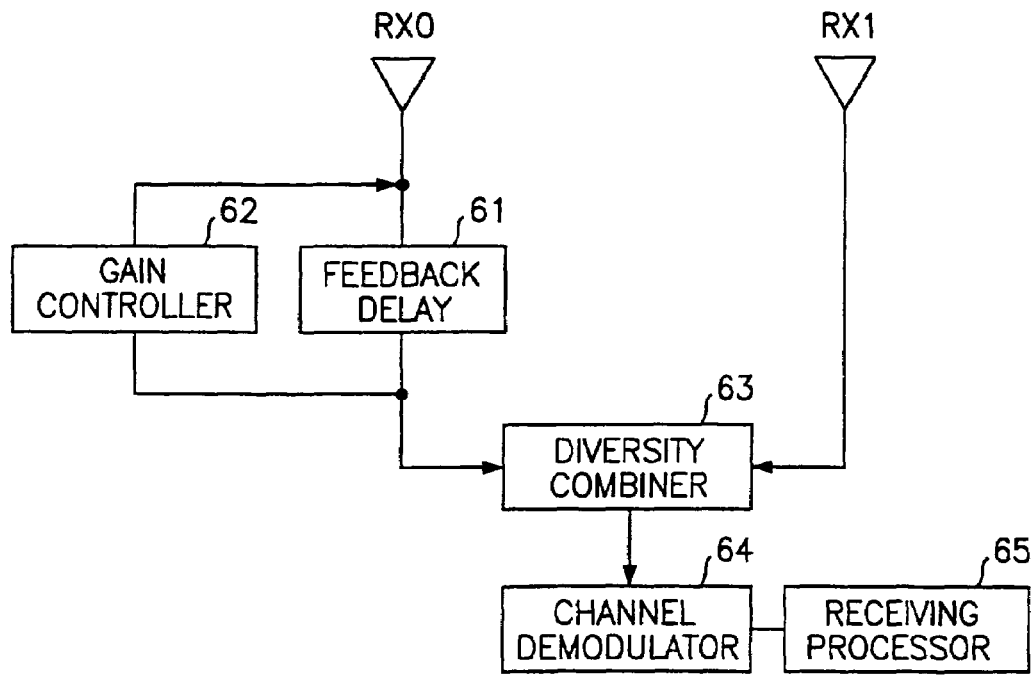
FIGS. 6A and 6B are block diagrams of receiving units having feedback delays in accordance with other embodiments of the present invention.
Figure 6B:
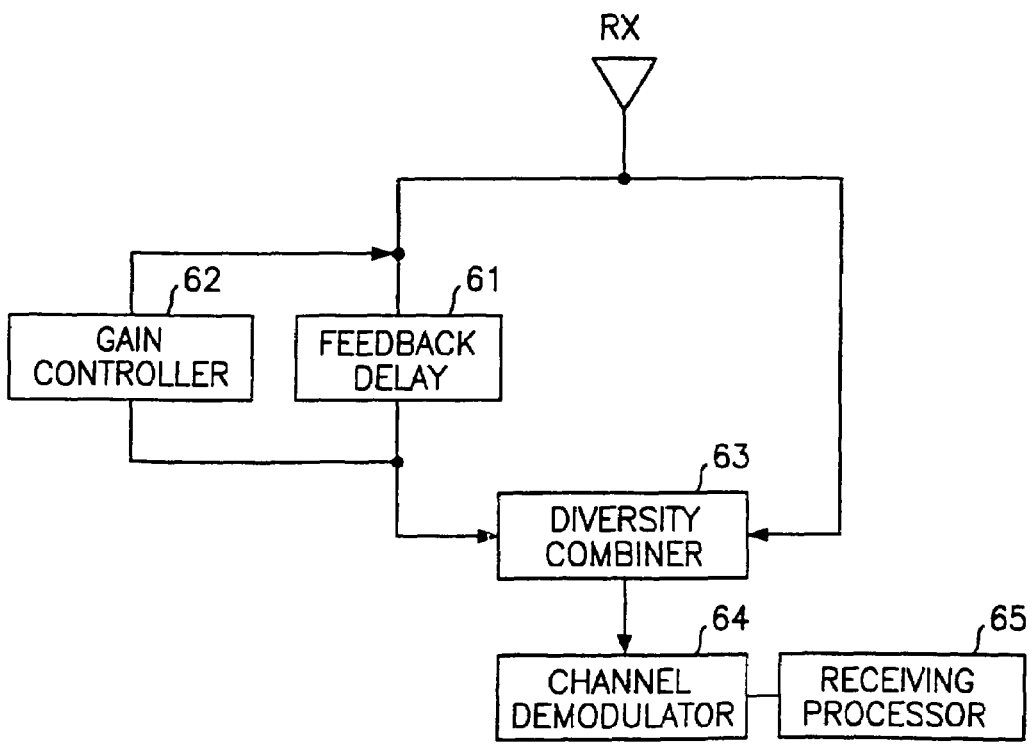

FIGS. 6A and 6B are block diagrams of receiving units having a feedback delay in accordance with other embodiments of the present invention.

Referring FIG. 6A, a signal from a MS at a remote distance is received by a receiving element Rx1 and a signal from a short distance is received by a receiving element Rx0 and delayed by a feedback delay 61. A delay value of the feedback delay 61 is set, the signal received by the receiving element Rx0 is delayed by a number received from a gain controller. The signal received through the receiving element Rx0 is delayed by the feedback delay number N (here, N=0, 1, 2, . . . ) and outputted to a diversity combiner 63.

Using the feedback delay 61, the cell coverage can be expanded limitlessly only if a forward or reverse transmission power is large enough. By adding a delay to the receiving element Rx1, a region in which most of mobile stations are gathered can be covered, thereby providing a stable call.

The signals received by the receiving elements Rx0 and Rx1 are combined in a diversity combiner 63, demodulated by a channel demodulator 64 and performed a receiving processing by a receiving processor 65, which is well known to ordinary one skilled in the art, for example deinterleaving, decoding, etc. Therefore, a detailed description of the receiving processor 37 will be skipped in here.

Referring to FIG. 6B, there is a different receiving element from the receiving unit of FIG. 6A. The receiving unit has the same constitution as one in FIG. 6A except that there is one receiving element Rx. Therefore, detailed description about the receiving unit in FIG. 6B will be skipped.

Figure 7A:
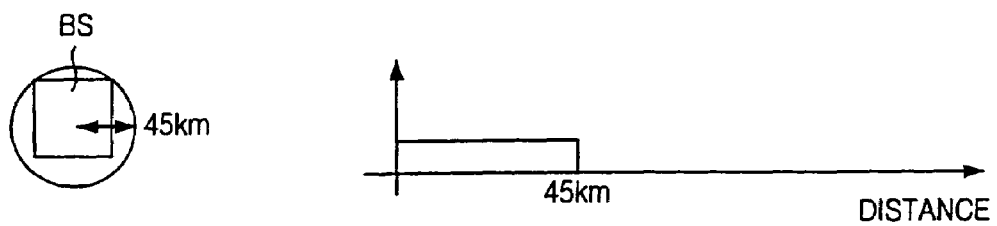
FIGS. 7A to 7C are explanative diagrams illustrating a method for expanding a cell coverage by using a feedback delay in accordance with another embodiment of the present invention.
Figure 7B:
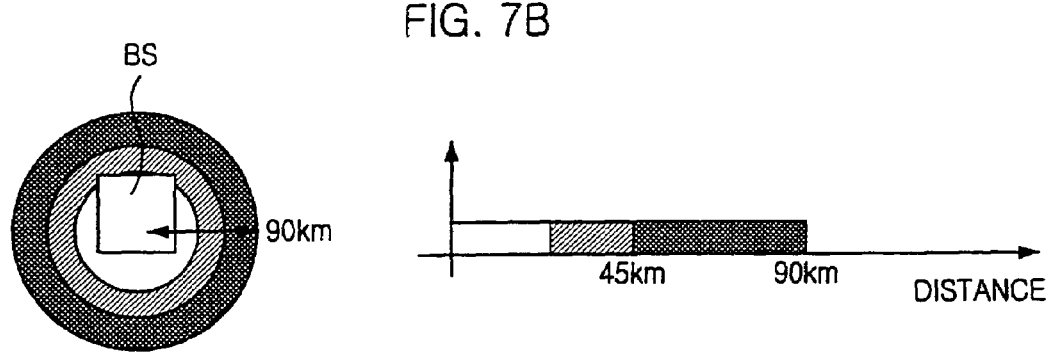
Figure 7C:
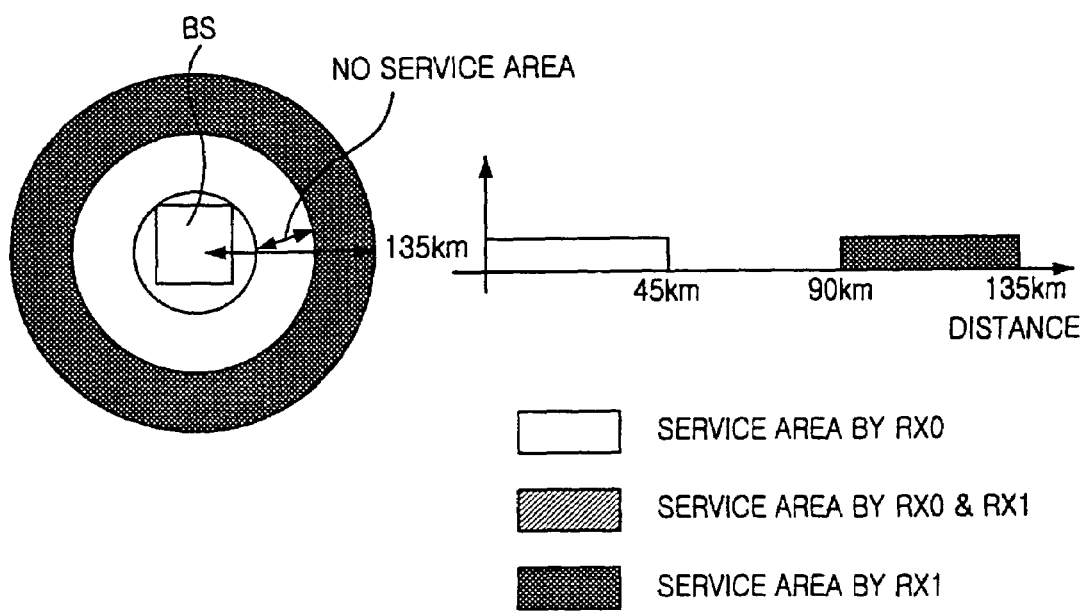

FIGS. 7A to 7C are explanative diagrams illustrating a method for expanding a cell coverage by using a feedback delay in accordance with another embodiment of the present invention.

Referring to FIG. 7A, a cell coverage is illustrated when there is no delay in the receiving unit of the base station. Referring to FIGS. 7B and 7C, cell coverages respectively expanded by 90 Km and 135 Km are illustrated. The cell coverage is expanded by controlling parameters for the base station, e.g., the preamble PN offset PRA_PN_offset and the transmission time advance fine adjust value Tx_Fine_Adj and delaying the received signal by using a delay such as the delay 31 described in FIG. 3.

Referring to FIG. 7C, the cell coverage is expanded by 90 Km or more than 90 Km. Since one delay element can delay only the signal between 0 and 45 Km, the signal between 45 Km and 90 Km cannot be acquired within the preamble access window.

Therefore, the signal in a range from 0 to 45 Km has a different delay value from the signal in a range from 45 to 90 Km. In order to solve this problem, use of a feedback is delay such like in FIG. 6A is preferred than use of a plurality of delay elements. The feedback delay having a minimum delay value is placed in the receiving unit and the received signal is delayed by N numbers of the minimum delay value, and then the signal has a delay value to be wanted.

In case described above referring to FIG. 7C, a delay value which a signal in a range from 45 to 90 Km should have is set as a delay value of the feedback delay. A signal in a range from 90 to 135 Km is passed without delay, the signal in a range from 45 to 90 Km is delayed by one time and a signal in a range from 0 to 90 Km is delayed by two times, the signals in whole of the cell coverage can be acquired.

Figure 8:
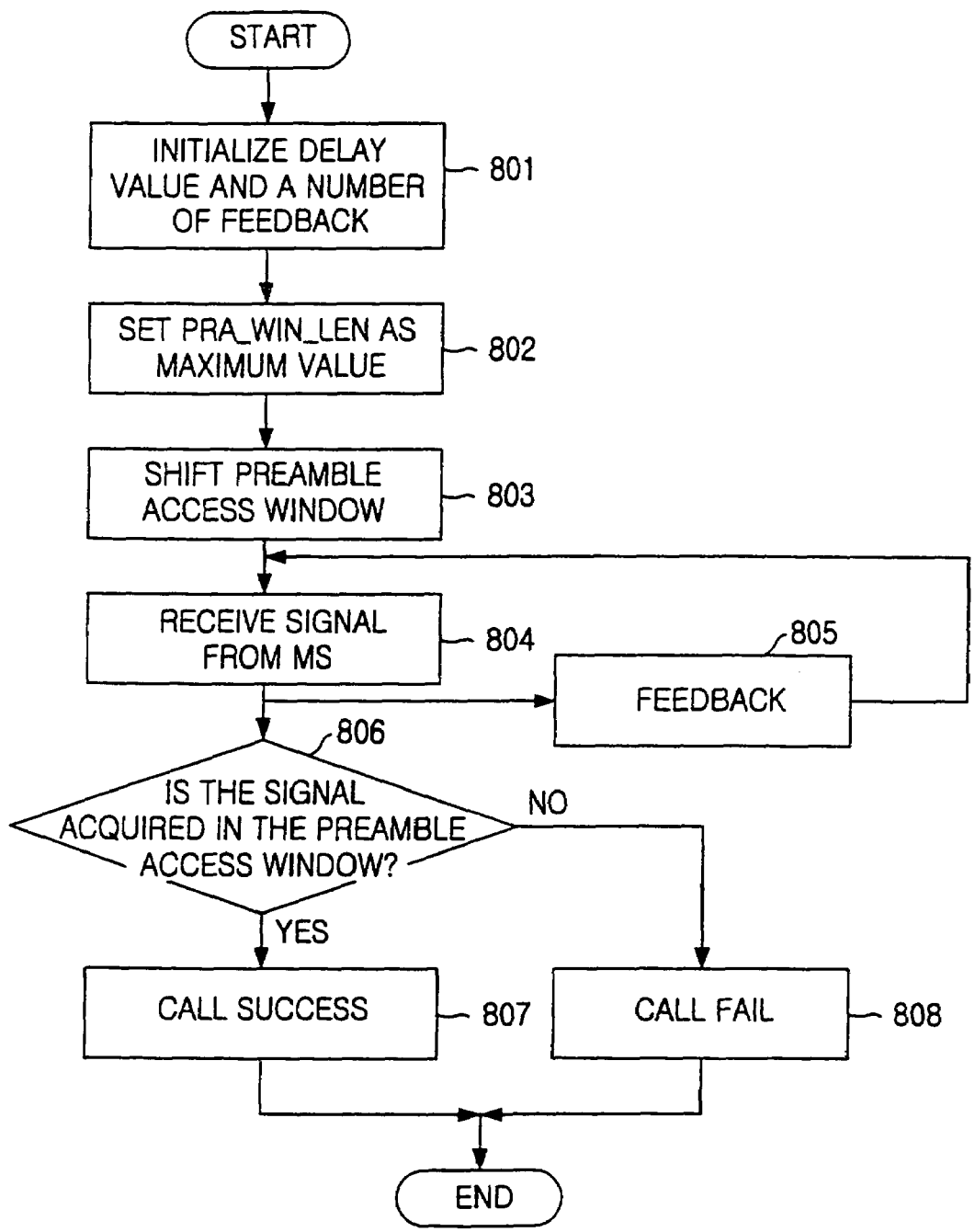
FIG. 8 is a flow chart illustrating a method for expanding a cell coverage by using a feedback delay.

FIG. 8 is a flow chart illustrating a method for expanding a cell coverage by using a feedback delay.

Referring to FIG. 8, a delay value of a feedback delay and a number N of feedback are initialized as '0' at step 801. A preamble access window length is set as a maximum value, i.e. 3072, at step S01, the cell coverage is expanded as 45 Km. In this embodiment, the preamble access window length should not have a maximum value, however, for expanding the cell coverage, the preamble access window length is preferred to be set as a maximum value.

After expanding the cell coverage at step 802, the preamble access window is shifted by setting parameters related with time advance, e.g., the preamble PN offset PRA_PN_Offset and the transmission time advance fine adjust value Tx_Fine_Adj at step 803. The transmission time advance fine adjust value Tx_Fine_Adj for a call connection is set as the equation 1.

A signal from the mobile station (MS) is received by the receiving elements Rx0 and Rx1 in the base station at step 804. The signal received by the receiving element Rx1 is passed and transmitted to the diversity combiner. The signal received by the receiving element Rx0 is delayed in the feedback delay by a certain time, in this embodiment about 20 $\mu$s at step 805. The signal delayed by the feedback delay is repeatedly delayed responsive to a control signal from the gain controller at step 805. The gain controller controls that the gain of the received signal becomes equal to a reference gain.

The proceed continues to step 806 to determine whether a round trip delay (RTD) of the received signal from the MS is acquired within the preamble access window for the access probe of the system.

If the RTD of the received signal is acquired, a call is setup at step 807. If not, a call is not setup at step 808.

Using the apparatus and method in accordance with the present invention, the cell coverage can be expanded without additional equipment in an area in which a base station is difficult to be established, e.g., sea and mountains, thereby the cost for establishing system can be reduced. Also, even though the cell radius is very large, there is no need to use a plurality of delay elements and only one feedback delay is necessary to be used. Therefore, the cost can be considerably reduced.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A method for expanding cell coverage in a code division multiple access (CDMA) mobile communication system comprising the steps of:

a) shifting a preamble access window by advancing transmission time of a transmission signal by a first delay time in order to acquire a first call access signal from a mobile station at a remote distance; and b) delaying a second call access signal from a mobile station at a short distance by a second delay time in order to acquire the second call access signal, wherein the transmission time of the transmission signal is advanced by delaying the transmission signal when being modulated; and wherein the first delay time is substantially equal to the second delay time, and the first delay time is expressed as:

$$\text{first delay time}(\mu s) = \frac{\text{Radius(Km)} \times 2}{3 \times 10^5} \times 10^6,$$

where Radius is a length of the expanded radius.

2. The method as recited in claim 1, wherein said step a) includes the step of expanding a length of the preamble access widow to a maximum value by adjusting a length of chips included in the transmission signal.

3. The method as recited in claim 1, wherein said step b) includes the steps of:
determining whether the second call access signal from the mobile station is acquired by the preamble access window; and
accessing the second call access signal to the preamble access window by delaying the second call access signal if the second call access signal is not acquired.

4. The method as recited in claim 3, wherein the second call access signal is delayed by a feedback delay.

5. A method for expanding cell coverage in a code division multiple access (CDMA) mobile communication system including at least a base station and a plurality of mobile stations, the method comprising the steps of:
a) expanding a length of a current preamble access window to a predetermined value;
b) determining the mobile station is within a cell coverage covered by the preamble access window;
c) shifting the preamble access window by advancing transmission time of a transmission signal by a first delay time in order to acquire at least a mobile station when the mobile station is out of the cell coverage; and
d) delaying a second call access signal from a mobile station at a short distance in order to acquire the second call access signal,
wherein the transmission time of the transmission signal is advanced by delaying the transmission signal when being PN modulated; and
wherein the first delay time is substantially equal to the second delay time, and the first delay time is expressed as:

$$\text{first delay time}(\mu s) = \frac{\text{Radius(Km)} \times 2}{3 \times 10^5} \times 10^6,$$

where Radius is a length of the expanded radius.

6. The method as recited in claim 5, wherein said step d) includes the steps of:
determining whether the second call access signal is acquired by the preamble access window; and
accessing the second call access signal to the preamble access window by delaying the second call access signal if the second call access signal is not acquired.

7. The method as recited in claim 6, wherein the second call access signal is delayed by a feedback delay.

8. An apparatus for expanding cell coverage in a code division multiple access (CDMA) mobile communication system including a plurality of mobile stations and at least a base station, comprising:
transmitting means for transmitting a transmission signal of which transmission time is advanced by a first delay time in order to acquire the transmission signal from a mobile station at a remote distance; and
receiving means for receiving and delaying a received signal from a mobile station at a short distance by a second delay time in order to acquire the received signal,
wherein the transmission time of the transmission signal is advanced by delaying the transmission signal when being PN modulated; and
wherein the first delay time is substantially equal to the second delay time, and the first delay time is expressed as:

$$\text{first delay time}(\mu s) = \frac{\text{Radius(Km)} \times 2}{3 \times 10^5} \times 10^6,$$

where Radius is a length of the expanded radius.

9. The apparatus as recited in claim 8, wherein said transmitting means includes:
means for generating a call access signal;
means for modulating the first call access signal on basis of pseudo noise signal and generating the transmission signal; and
means for advancing the transmission signal by the first predetermined time by controlling the pseudo noise signal.

10. The apparatus as recited in claim 8, wherein said receiving means includes:
means for delaying the received signal by a first predetermined time; and
means for demodulating the delayed received signal and restoring the call access signal.

11. The apparatus as recited in claim 10, wherein the second call access signal is delayed by a feedback delay.

12. A method for expanding cell coverage applied to a code division multiple access (CDMA) mobile communication system, the method comprising the steps of:
a) expanding a length of a current preamble access window to a maximum value;
b) setting operation parameters related to time advance in order to acquire a first call access signal from a mobile station at a remote distance when the mobile station is out of the cell coverage; and
c) acquiring a second call access signal from a mobile station at a short distance within the preamble access window by delaying the second call access signal by a predetermined delay time,
wherein the transmission time of the transmission signal is advanced by delaying the transmission signal when being PN modulated, and
wherein the predetermined delay time is expressed as:

$$\text{first delay time}(\mu s) = \frac{\text{Radius(Km)} \times 2}{3 \times 10^5} \times 10^6,$$

where Radius is a length of the expanded radius.

13. The method as recited in claim 12, wherein said step c) includes the steps of:
- determining whether the second call access signal is acquired within the preamble access window;
- accessing the second call access signal to the preamble access window by delaying the second call access signal if the second call access signal is not acquired; and
- accessing the second call access signal to the preamble access window if the second call access signal is acquired.

14. The method as recited in claim 13, wherein the operation parameters include a preamble pseudo noise off set used for expanding the cell coverage.

15. The method as recited in claim 13, wherein the operation parameters include a transmission time advance fine adjust value used for expanding the cell coverage.

16. A method for expanding cell coverage applied to a code division multiple access (CDMA) mobile communication system, the method comprising the steps of:
- a) expanding a length of a current preamble access window for access probe to a maximum value;
- b) shifting the preamble access window by setting operation parameters in order to acquire a first call access signal from a mobile station at a remote distance when the mobile station is out of the expanded preamble access window; and
- c) acquiring a second call access signal from a mobile station at a short distance within the preamble access window by delaying the second call access signal by a predetermined delay time, by using a feedback delay which makes the second call access signal have a different delay value on basis of a distance between a location of the mobile station and a location on a cell radius,
- wherein the transmission time of the transmission signal is advanced by delaying the transmission signal when being PN modulated, and
- wherein the predetermined delay time is expressed as:

$$\text{first delay time}(\mu s) = \frac{\text{Radius(Km)} \times 2}{3 \times 10^5} \times 10^6,$$

where Radius is a length of the expanded radius.

17. The method as recited in claim 16, wherein said step a) includes the steps of:
- initializing a delay value and a number of delay of the feedback delay; and
- setting the length of the preamble access window as a maximum value.

18. The method as recited in claim 16, wherein the cell radius is expanded 45 Km or more in said step b).

19. The method as recited in claim 16, wherein said step c) includes the steps of:
- receiving the second call access signal;
- delaying the second call access signal for a predetermined time by feeding back the second call access signal by a certain number;
- determining whether the second call access signal or the delayed signal are acquired within the preamble access window;
- performing a call access if the second call access signal or the delayed second call access signal is acquired within the preamble access window; and
- stopping a call access if not.

20. The method as recited in claim 19, wherein the operation parameters include a preamble pseudo noise offset used for expanding the cell coverage.

21. The method as recited in claim 19, wherein the operation parameters include a transmission time advance fine adjust value used for expanding the cell coverage.

22. The method as recited in claim 19, wherein the second call access signal is substantially delayed for 20 µs by the feedback delay.

23. A machine-accessible medium for expanding cell coverage applied to a code division multiple access (CDMA) mobile communication system, the machine-accessible medium containing instructions that, when executed, cause a machine to:
- a) expand a length of a current preamble access window to a maximum value;
- b) set operation parameters in order to acquire a first call access signal from a mobile station at a remote distance when the mobile station is out of the cell coverage; and
- c) acquire a second call access signal from a mobile station at a short distance within the preamble access window by delaying the second call access signal,
- wherein the transmission time of the transmission signal is advanced by delaying the transmission signal when being PN modulated; and
- wherein the predetermined delay time is expressed as:

$$\text{first delay time}(\mu s) = \frac{\text{Radius(Km)} \times 2}{3 \times 10^5} \times 10^6,$$

where Radius is a length of the expanded radius.

24. A machine-accessible medium for expanding cell coverage applied to a code division multiple access (CDMA) mobile communication system, the machine-accessible medium containing instructions that, when executed, cause a machine to:
- a) expand a length of a current preamble access window for access probe to a maximum value;
- b) shift the preamble access window by setting operation parameters in order to acquire a first call access signal from a mobile station at a remote distance when the mobile station is out of the expanded preamble access window; and
- c) acquire a second call access signal from a mobile station at a short distance within the preamble access window by delaying the second call access signal by a feedback delay which makes the second call access signal have a different delay value on basis of a distance between a location of the mobile station and a location on a cell radius,
- wherein the transmission time of the transmission signal is advanced by delaying the transmission signal when being PN modulated; and
- wherein the predetermined delay time is expressed as:

$$\text{first delay time}(\mu s) = \frac{\text{Radius(Km)} \times 2}{3 \times 10^5} \times 10^6,$$

where Radius is a length of the expanded radius.

* * * * *